(12) United States Patent
Chapel et al.

(10) Patent No.: US 9,997,957 B2
(45) Date of Patent: *Jun. 12, 2018

(54) AUTO-SWITCHING DUPLEX MODULE

(71) Applicant: Zonit Structured Solutions, LLC, Boulder, CO (US)

(72) Inventors: Steve Chapel, Iliff, CO (US); William Pachoud, Boulder, CO (US)

(73) Assignee: Zonit Structured Solutions, LLC, Boulder, CO (US)

( * ) Notice: Subject to any disclaimer, the term of this patent is extended or adjusted under 35 U.S.C. 154(b) by 400 days.

This patent is subject to a terminal disclaimer.

(21) Appl. No.: 14/249,151

(22) Filed: Apr. 9, 2014

(65) Prior Publication Data

US 2015/0076912 A1    Mar. 19, 2015

Related U.S. Application Data

(63) Continuation of application No. 13/466,950, filed on May 8, 2012, now abandoned, which is a continuation (Continued)

(51) Int. Cl.
| | |
|---|---|
| *H02J 9/00* | (2006.01) |
| *H02J 9/06* | (2006.01) |
| *H01R 13/66* | (2006.01) |
| *H01R 13/70* | (2006.01) |
| *H02J 4/00* | (2006.01) |

(52) U.S. Cl.
CPC .......... *H02J 9/061* (2013.01); *H01R 13/6683* (2013.01); *H01R 13/70* (2013.01);

(Continued)

(58) Field of Classification Search
CPC ...................................................... H02J 9/061
See application file for complete search history.

(56) References Cited

U.S. PATENT DOCUMENTS

| | | | |
|---|---|---|---|
| 5,917,253 A | 6/1999 | Rusnack | |
| 6,608,403 B2 * | 8/2003 | Liu | H02J 1/102 |
| | | | 307/43 |

(Continued)

FOREIGN PATENT DOCUMENTS

| | | | |
|---|---|---|---|
| WO | 2006015366 A2 | 2/2006 | |
| WO | WO 2006015366 A2 * | 2/2006 | ............... H02J 9/06 |

OTHER PUBLICATIONS

Chinese Office Action, dated Jul. 25, 2017, for Application 201510854800.4.

*Primary Examiner* — Fritz M Fleming
(74) *Attorney, Agent, or Firm* — Marsh Fischmann & Breyfogle LLP; Kent A. Fischmann

(57) ABSTRACT

A system and method ("utility") for providing power to an electrically powered device from alternate, redundant power sources via a single power cord. The utility is operable to provide redundant power to an electrical device having a power cord terminating in a standard plug. The utility is operable to sense a loss of power quality from one power source, and to switch a connection to another power source in response to the loss. The utility may be configured to match the form factor of a standard (e.g., NEMA or other electrical standard) duplex receptacle unit. The utility may be incorporated into a standard outlet box or may plug into a standard outlet box.

29 Claims, 8 Drawing Sheets

Related U.S. Application Data of application No. 12/569,745, filed on Sep. 29, 2009, now Pat. No. 8,174,149, which is a continuation-in-part of application No. 12/531,231, filed as application No. PCT/US2008/057144 on Mar. 14, 2008, now abandoned.

(60) Provisional application No. 60/894,848, filed on Mar. 14, 2007.

(52) U.S. Cl.
CPC . *H02J 4/00* (2013.01); *H02J 9/06* (2013.01); *H02J 2009/068* (2013.01); *Y10T 307/615* (2015.04); *Y10T 307/696* (2015.04); *Y10T 307/735* (2015.04)

(56) References Cited

U.S. PATENT DOCUMENTS

| | | | | |
|---|---|---|---|---|
| 6,628,009 | B1* | 9/2003 | Chapel | H02J 3/26 307/14 |
| 8,004,115 | B2* | 8/2011 | Chapel | H01R 25/003 307/38 |
| 8,174,149 | B2* | 5/2012 | Chapel | H02J 9/061 307/64 |
| 2002/0130556 | A1* | 9/2002 | Hohri | H02J 9/061 307/65 |
| 2004/0165322 | A1* | 8/2004 | Crawford | H01H 9/542 361/2 |

* cited by examiner

AUTO-SWITCHING DUPLEX MODULE

CROSS-REFERENCE TO RELATED APPLICATION

This application is a continuation of U.S. patent application Ser. No. 13/466,950, entitled, "AUTO-SWITCHING DUPLEX MODULE," filed on May 8, 2012. which is a continuation of U.S. patent application Ser. No. 12/569,745, entitled, "AUTO-SWITCHING DUPLEX MODULE," filed on Sep. 29, 2009 (now U.S. Pat. No. 8,174,149 which issued on May 8, 2012), which is a continuation-in-part of U.S. patent application Ser. No. 12/531,231, entitled, "AUTO-SWITCHING DUPLEX MODULE," filed on Sep. 14, 2009, which is the U.S. National Stage of PCT Application PCT/US2008/57144, entitled, "AUTOMATIC TRANSFER SWITCH MODULE," filed on Mar. 14, 2008, which claimed priority from U.S. Provisional Application No. 60/894,848, entitled, "NEMA AUTO-SWITCHING DUPLEX MODULE," filed on Mar. 14, 2007. The contents of all of the above-noted applications are incorporated herein by reference as if set forth in full and priority to these applications is claimed to the full extent allowable under U.S. law and regulations.

BACKGROUND

It is often the case that data processing equipment and medical devices have only one power supply, and therefore, one power cord. These types of equipment may often be employed in critical applications. For example, medical equipment may be used in situations where a person's life may be dependent upon the continuing operation of the medical device. Additionally, electronic data processing (EDP) equipment may be used in various systems where "downtime" may be extremely costly. Therefore, it is desirable to minimize the downtime of these devices.

One of the most significant causes of downtime for electronic equipment is loss of, power. This may occur due to human error, failure of a component in the device, or failure of a component in the power delivery path that leads to the device. To provide for greater reliability, redundancy is often provided in these "mission-critical" applications by implementing systems that greatly increase the complexity of the application. Further, this redundancy often comes at a high price because each system generally will have a duplicate standby power supply to provide power in the event of an interruption of power from the main power supply.

It is against this background that the auto-switching duplex module of the present invention has been developed.

SUMMARY

The present invention is directed to a system for providing power to an electrically powered device—e.g., such as a critical network device, critical medical device, or other critical or non-critical device, from alternate, redundant power sources via a single power cord. In this manner, a higher degree of reliability can be achieved for conventional electrical devices having a single power cord. Moreover, such reliability can be achieved by appropriately configuring conventional outlets without requiring additional power cords. The invention can therefore be implemented simply and with minimal expense, thus enabling higher reliability in many contexts.

In accordance with one aspect of the present invention, an apparatus is provided for use in delivering power to a device having a power cord terminating in a standard plug. The apparatus includes a first standard receptacle for receiving a standard plug, first and second terminal assemblies for interconnection to respective first and second power sources, and a switch for selectively interconnecting the first standard receptacle to either the first terminal assembly or the second terminal assembly. In this manner, a single standard receptacle allows access to alternate power sources for enhanced reliability.

For example, the switch may operate automatically upon a loss of power quality. That is, the switch may be operative for sensing a loss of power quality from one of the power sources and for switching a connection of the receptacle in response to the loss of power quality. In addition, the apparatus may be configured to approximate the form factor of a standard (e.g., NEMA or other electrical standard) duplex receptacle unit. That is, the apparatus may be incorporated into a standard outlet box or may plug into a standard outlet box. In this regard, the apparatus may include a second standard receptacle, which may also be switchable between the two power sources. In one implementation, the apparatus can be used in conjunction with an appropriately configured conventional power strip. For example, where the power strip provides outlets associated with first and second power sources, the apparatus may be plugged into the power strip to provide an auto-switching receptacle. Alternatively, the strip may be plugged into the auto-switching receptacle such that the strip provides a number of auto-switching receptacles to provide power to various electrical devices.

The auto-switching module may be implemented in a small device suitable for deployment in back of a rack-mounted device. For example, in the U.S. patent application Ser. No. 12/531,212 entitled, "AUTOMATIC TRANSFER SWITCH MODULE," which claims priority from PCT Application PCT/US2008/57144 and, in turn, to U.S. Provisional Application No. 60/894,842, all of which are incorporated herein by reference, a single cord from a device is connected to two power strips, associated with two power sources, by way of a "y" configured set of cords. The auto-switching module can be used to provide auto-switching as between the two sources (e.g., at the "y" intersection) so as to implement auto-switching at the device, rather than at the rack level, as may be desired.

In accordance with another aspect of the present invention, a method for operating an auto-switching receptacle is provided. The method involves providing a first standard receptacle for receiving a standard plug where the receptacle is selectively associated with first and second power sources via a switch. An auto-switch device senses a loss of power quality from one of the power sources and, responsive to the loss of power quality, the switch cycles to provide power from the other source via the standard receptacle.

According to a still further aspect of the present invention, a method for using an auto-switching receptacle is provided. The method involves providing a module, including a module receptacle for receiving a standard plug, and a switch for switching a power source connection of the module receptacle. The method further involves connecting the module to first and second power sources and connecting a standard plug to the module receptacle.

For example, the module may be connected to the first and second power sources by providing a standard duplex electrical outlet configured to provide power from first and second power sources and connecting the module to the standard outlet. Similarly, the module may be connected to the first and second power sources by providing a power strip having receptacles to provide power from the first and second sources and connecting the module to the power strip. The standard plug may be connected to the module by plugging the standard plug into the receptacle or may be indirectly connected.

DETAILED DESCRIPTION

Figure 1:
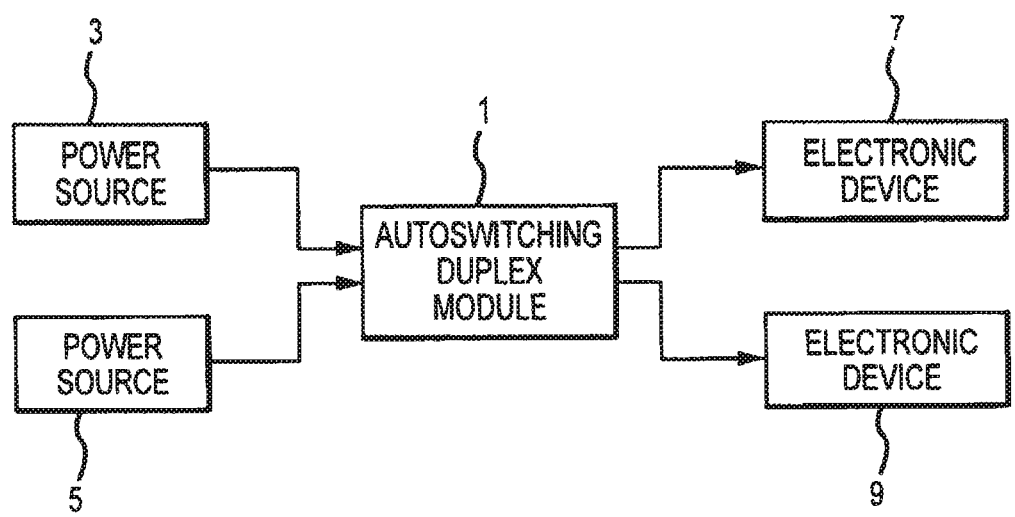
FIG. 1 illustrates a block diagram of an application for an auto-switching module of the present invention.

While the invention is susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives falling within the scope and spirit of the invention as defined by the claims.

FIG. 1 illustrates a block diagram of an application for an auto-switching duplex module 1 of the present invention. The module 1 may be configured to match the form factor of a standard (e.g., NEMA or other electrical standard) duplex receptacle unit. That is, the module 1 may be incorporated into a standard outlet box or may plug into a standard outlet box. The module 1 may be coupled to one or more electronic devices (e.g., electronic devices 7, 9) that may each include a single power cord that terminates in a standard plug. The electronic devices may be any electrically powered device, such as a critical network device, critical medical device, or other critical or non-critical devices. The module 1 may include one or more standard receptacles for receiving a standard plug of the electronic devices 7 and 9. Further, the module 1 may be adapted to include terminal assemblies or wire-lead connections that permit coupling to a power source 3 and a power source 5.

The module 1 may include logic for selectively interconnecting the standard receptacles to the terminal assembly that is coupled to either the power source 3 or the power source 5. In this regard, each standard receptacle, and therefore each electronic device, is provided with access to alternate power sources for enhanced reliability. The logic for selectively interconnecting the standard receptacles to the terminal assemblies may include a switch that is operable to automatically cycle upon the loss of power quality. That is, the switch may be operative for sensing a loss of power quality on one of the power sources (e.g., the power source 3), and for switching a connection of the standard receptacles in response to the loss of power quality.

Figure 2:
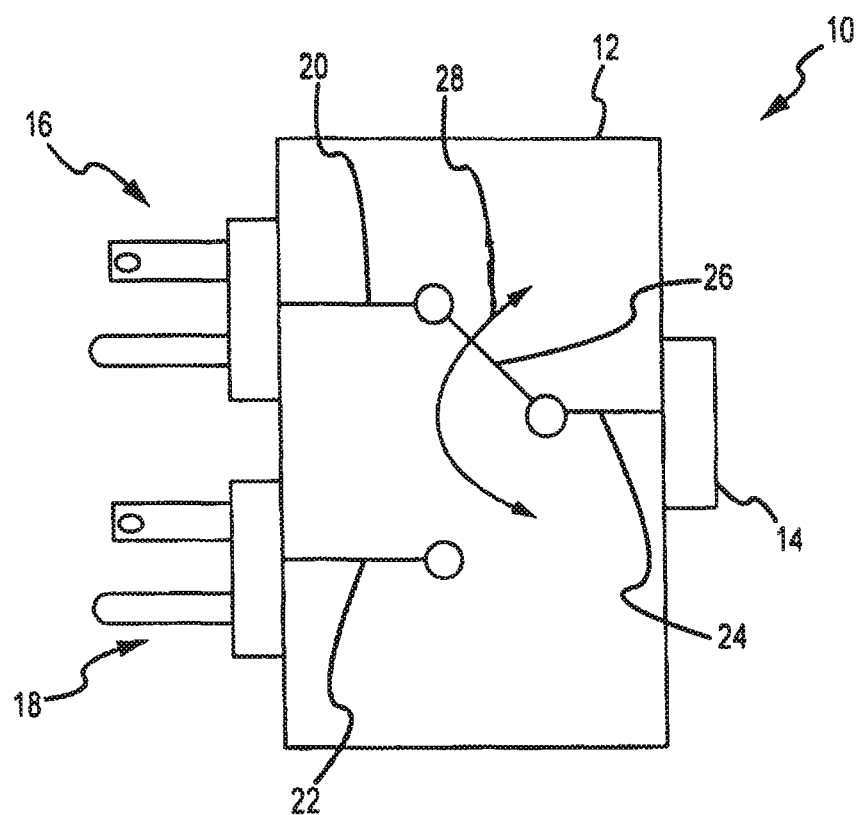
FIG. 2 illustrates an exemplary auto-switching module of the present invention.

FIG. 2 illustrates an auto-switching module 10 that is configured to match the form factor of a standard (e.g., NEMA or other electrical standard) duplex receptacle unit. The housing 12 of the module 10 may include terminal assemblies (e.g., plugs 16 and 18) that are configured to plug into a standard duplex receptacle unit. The module 10 may further include a standard receptacle 14 for receiving a standard plug from an electronically powered device (e.g., a network device, a medical device, etc). Inside the housing 12, the electrical connection 24 of the receptacle 14 may be selectively interconnected with the electrical connections 20 and 22 of the plugs 16 and 18, respectively, via a switching means 28 and an electrical connection 26. Although depicted as a single line, it should be readily understood that the electrical connections 20, 22, 24, and 26 may generally comprise multiple electrical conductors (e.g., line, neutral, ground wires, etc.).

In operation, the plugs 16 and 18 may be plugged into a standard-sized duplex receptacle unit that is configured to provide power from a first power source (e.g., the power source 3 of FIG. 1) at a first receptacle, and a second power source (e.g., the power source 5 of FIG. 1) at a second receptacle. In this manner, the module 10 may be operable to receive power from one power source at plug 16, and to receive power from another power source at plug 18. Further, an electronically powered device that has a single power cord that terminates in a standard plug may be plugged into the module 10 at the standard receptacle 14.

The switching means 28 may be operable to couple the electrical connection 26 between the electrical connection 24 of the receptacle 14 and the electrical connection 20 of the plug 16 when there is sufficient power available at plug 16 (e.g., there is no loss of power quality on the power source coupled to the plug 16). The switching means 28 may further be operable to sense a loss of power at the electrical connection 20 (e.g., due to a loss of power quality from the power source that is coupled to the plug 16), and to then automatically couple the electrical connection 26 between the electrical connection 24 of the standard receptacle 14 and the electrical connection 22 of the plug 18, which is coupled to a separate power source. In this manner, the electronic device that is plugged into the receptacle 14 of the module 10 may continue to receive power despite a loss of power quality at the power source coupled to the plug 16. The switching means 28 may be any device that is suitable for this application. For example, as discussed below in relation to FIG. 3, the switching means 28 may comprise one or more relay switches. Further, the switching means 28 may include one or more solid-state devices. Those having skill in the art will readily recognize that various types of circuitry may be used to achieve the function of the switching means 28.

The switching means 28 may also be operable to sense a restoration of power at the plug 16, and further to switch the electrical connection 26 back to the power source coupled to the plug 16 when the power has returned to an acceptable quality. In this configuration, the power source coupled to the plug 16 may be designated as the primary power source, while the power source coupled to the plug 18 may serve as a secondary power source. In another configuration, the switching means 28 may be operable to sense the voltage level at both of the plugs 16 and 18, and to only cycle when a loss of power quality occurs at the power source that is then coupled to the receptacle 14. That is, in this configuration, the power sources function as alternate sources, rather than primary and secondary power sources.

It should be appreciated that the electrical wiring that supplies standard wall duplex receptacles can easily be modified during construction to supply the necessary separate branch circuits to the module 10 (i.e., one branch circuit coupled to one of the receptacles of the duplex pair, and an alternate branch circuit coupled to the complementary receptacle of the duplex pair). Currently available duplex receptacles are designed to allow electrical separation of each of the receptacles of a duplex pair. Thus, retrofitting wired locations may be accomplished by delivering the required branch circuits to desired locations and modifying the present configuration of the existing duplex receptacle. In this regard, the modified traditional receptacle may then be used to supply the module 10 for its intended purpose.

Figure 3:
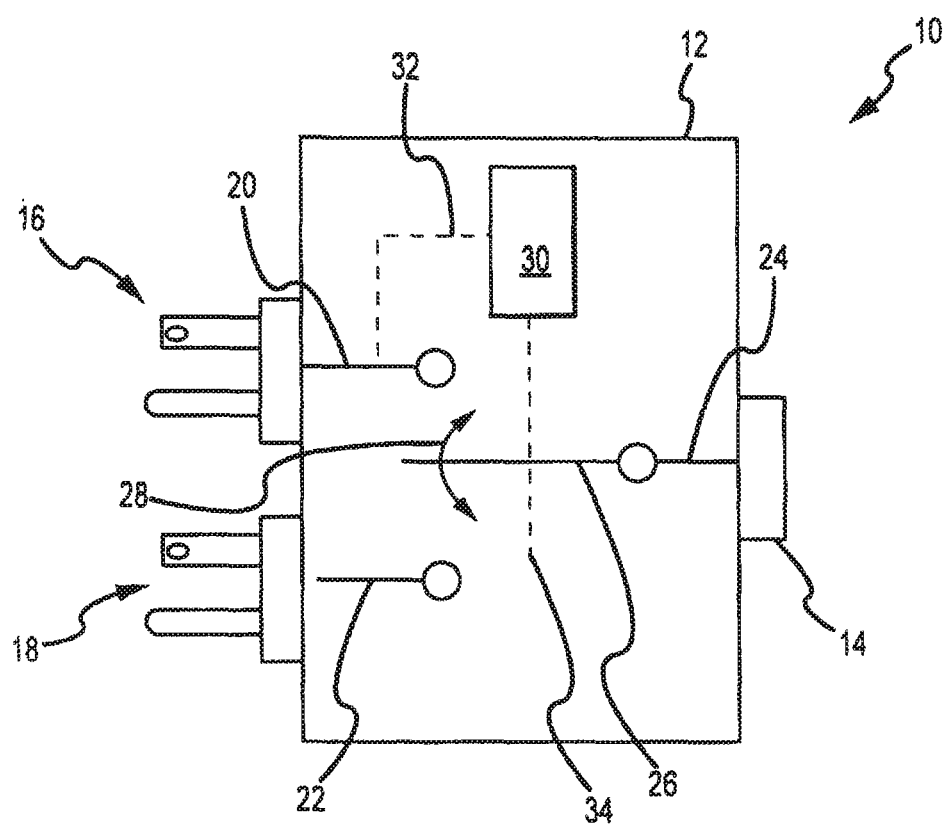
FIG. 3 illustrates another exemplary auto-switching module of the present invention.

FIG. 3 illustrates the module 10 shown in FIG. 2, wherein the switching means 28 includes a relay 30. In operation, the relay 30 may be coupled to the electrical connection 20 via a conductor 32. The relay 30 may be operable to couple the electrical connection 24 to the electrical connection 20 via the electrical connection 26 by a control mechanism represented by the dashed line 34 when the voltage at the plug 16 is above a predetermined threshold. That is, the voltage at the electrical connection 20 may "energize" the relay 30 such that the control mechanism 34 couples the connection 26 between the connections 20 and 24. The relay 30 may further be operable to sense the voltage at the plug 16, and, in response to a loss of power quality, cycle the switching means 28 by coupling the electrical connection 26 between the electrical connections 22, 24. In this manner, an electrical device that is plugged into the receptacle 14 will receive continuous power despite a loss of power quality at the power source that is coupled to the plug 16. In other words, the electrical device will receive power from the power source that is coupled to the plug 18 only when the power quality from the power source coupled to the plug 16 is unacceptable.

Figure 4:
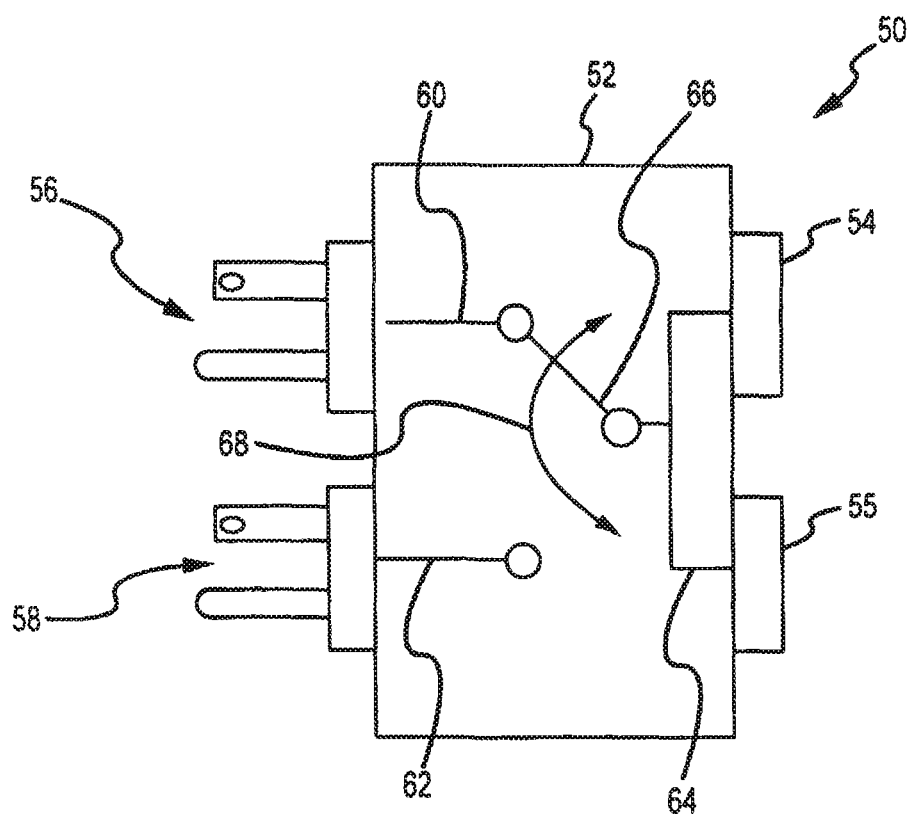
FIG. 4 illustrates another exemplary auto-switching module of the present invention.

FIG. 4 illustrates another embodiment of an auto-switching duplex module 50. In this embodiment, the housing 52 of the module 50 includes two standard receptacles 54 and 55 for receiving standard plugs from electronic devices that have power cords that terminate in standard plugs. Further, similar to the module 10 of FIG. 2, the housing 52 may include standard plugs 56 and 58 that are configured to plug into a standard receptacle unit (e.g., NEMA or other electrical standard). The receptacles 54 and 55 may be coupled to an electrical connection 64, which may be selectively interconnected to alternate power sources through the switching means 68 and the electrical connections 60 and 62 that are coupled to the plugs 56 and 58. In this regard, the auto-switching duplex module 50 provides for two electrical devices to receive redundant power, which may enable higher reliability in many contexts. Further, when coupled to a standard duplex receptacle, the module 50 operates to maintain the receptacle count in the branch circuit. That is, the designed per receptacle power density of the branch circuit is preserved.

Figure 5A:
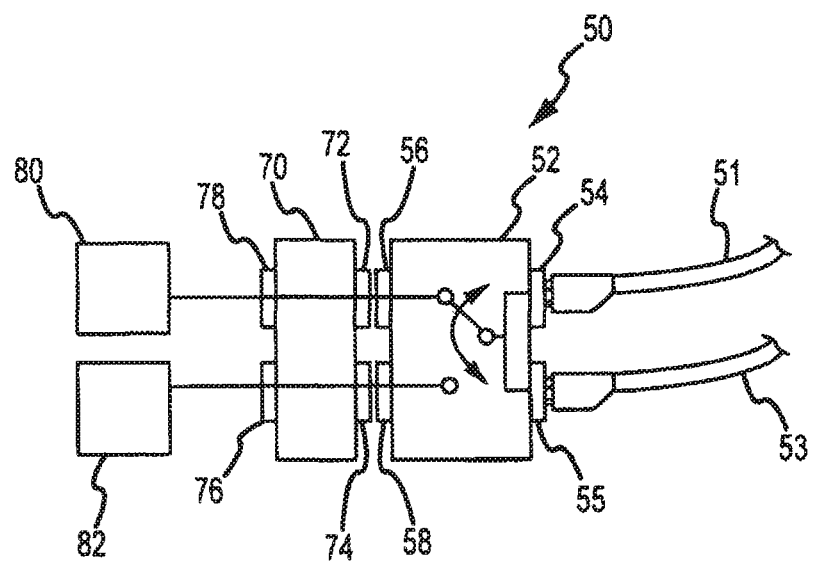
FIG. 5A illustrates an application for the auto-switching module shown in FIG. 4.

FIG. 5A illustrates an exemplary application for the auto-switching module 50 shown in FIG. 4. As shown, the power cords 51 and 53 of two electrical devices (now shown) may be plugged into the standard receptacles 54 and 55 of the housing 52 of the module 50. In turn, the plugs 56 and 58 of the module 50 may be plugged into standard receptacles 72 and 74 of a standard duplex receptacle unit 70 (e.g., NEMA or other electrical standard). The standard receptacle unit 70 may include terminal assemblies 76 and 78 that are adapted to couple with two power sources 80 and 82. In this manner, two electrical devices that terminate in a single standard plug may be provided with redundant power through the auto-switching duplex module 50.

Figure 5B:
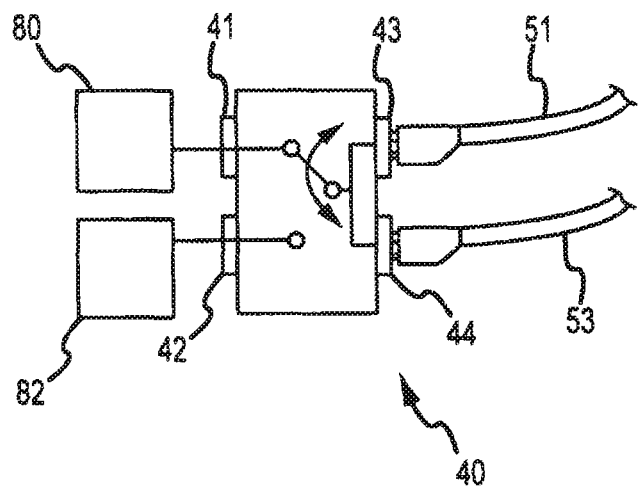
FIG. 5B illustrates an application for an exemplary auto-switching module.

FIG. 5B illustrates an exemplary application for an auto-switching duplex module 40. In this embodiment, the module 40 is incorporated into the form factor of a standard duplex receptacle unit (e.g., NEMA or other electrical standard). In this regard, the power cords 51 and 53 of two electrical devices (not shown) may be plugged into the standard receptacles 43 and 44 of the module 40. Further, the module 40 may include terminal assemblies 41 and 42 for coupling to the power supplies 80 and 82, respectively. In this configuration, two electrical devices are provided with redundant power by connecting them with the module 40. Advantageously, the module 40 may be installed in any location where a conventional standard receptacle unit may be installed (e.g., a wall, a rack, a power strip, etc.).

Figure 6:
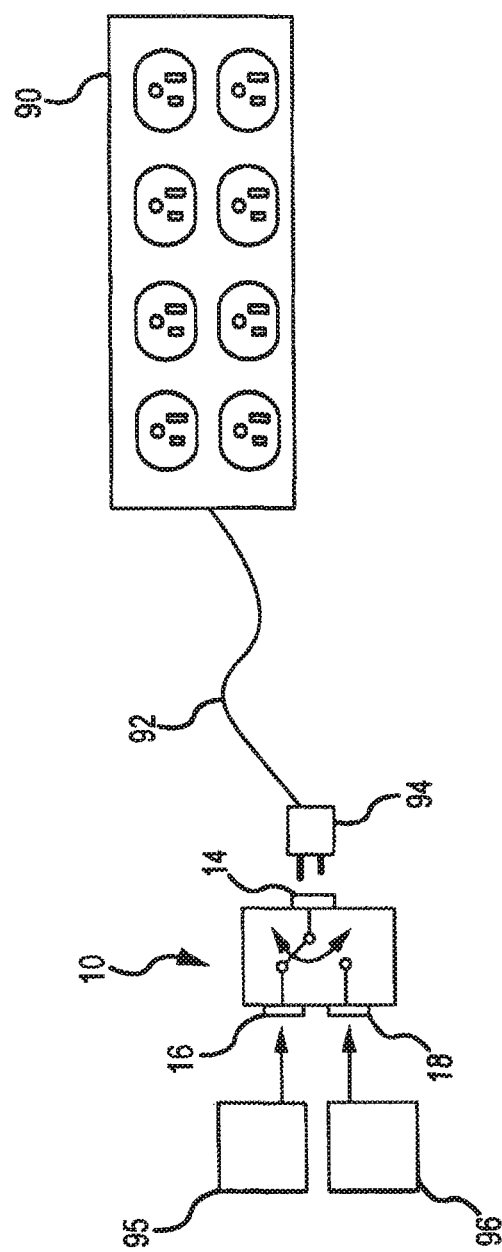
FIG. 6 illustrates an application for the auto-switching module shown in FIG. 2.

FIG. 6 illustrates an exemplary application for the auto-switching module 10 shown in FIG. 2. In this application, the module 10 may be coupled to two power sources 95 and 96 through terminal assemblies 16 and 18, which may be standard plugs or any other suitable coupling mechanism. Further, a standard receptacle unit (e.g., NEMA or other electrical standard) may be included between the module 10 and the power sources 95 and 96 to provide the coupling. A conventional power strip 90 that includes a plurality of receptacles may be coupled to the module 10 at the receptacle 14. The power strip 90 may include a power cord 92 that terminates in a standard plug 94, so as to provide the necessary coupling with the module 10. In this configuration, the module 10 serves to provide the plurality of receptacles of the power strip 90 with redundant power. As can be appreciated, multiple electrical devices may be plugged into the power strip 90, and operated with redundant power sources 95 and 96.

Figure 7:
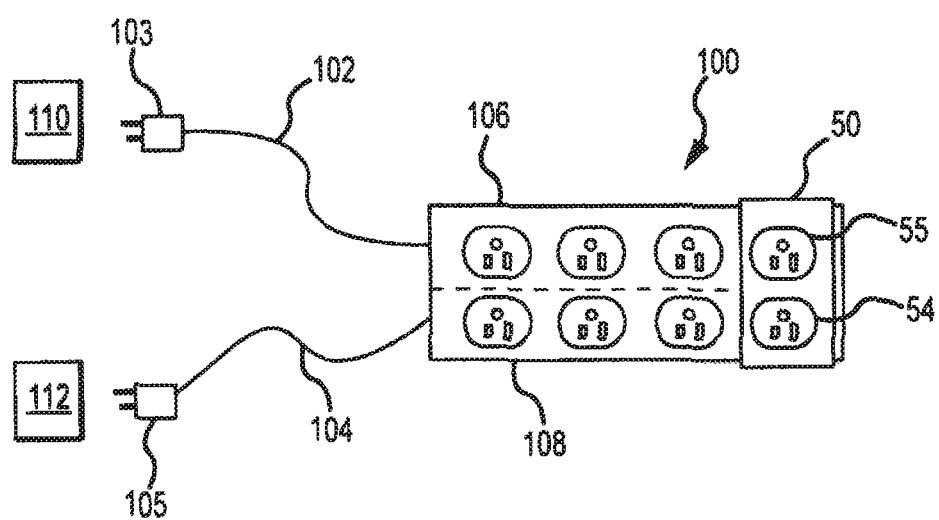
FIG. 7 illustrates another application for the auto-switching module shown in FIG. 4.

FIG. 7 illustrates yet another exemplary application for the auto-switching duplex module 50 of FIG. 4. A shown, a power strip 100 is adapted to provide multiple sets of duplex receptacles (e.g., four sets of duplex receptacles). A first portion 106 (i.e., the top row of receptacles) of the power strip may include receptacles that are coupled to a power source 110 through a power cord 102 and a standard plug 103. Similarly, a second portion 108 (i.e., the bottom row of receptacles) of the power strip 100 may be coupled to a second power source 112 through a power cord 104 and a plug 105. Further, the auto-switching duplex module 50 may be plugged into the power strip 100, such that one plug of the module 50 is plugged into one receptacle of each of the portions 106 and 108. In this manner, two electrical devices may be plugged into the receptacles 54 and 55 of the module 50, and be provided with redundant power from the power sources 110 and 112. As can be appreciated, multiple modules 50 may be plugged into the power strip 90 to provide additional sources of redundant power. Furthermore, the auto-switching means of the module 50 may be directly incorporated into the power strip 90, so that the power strip 90 itself provides redundant power from the power sources 110 and 112.

Figure 8:
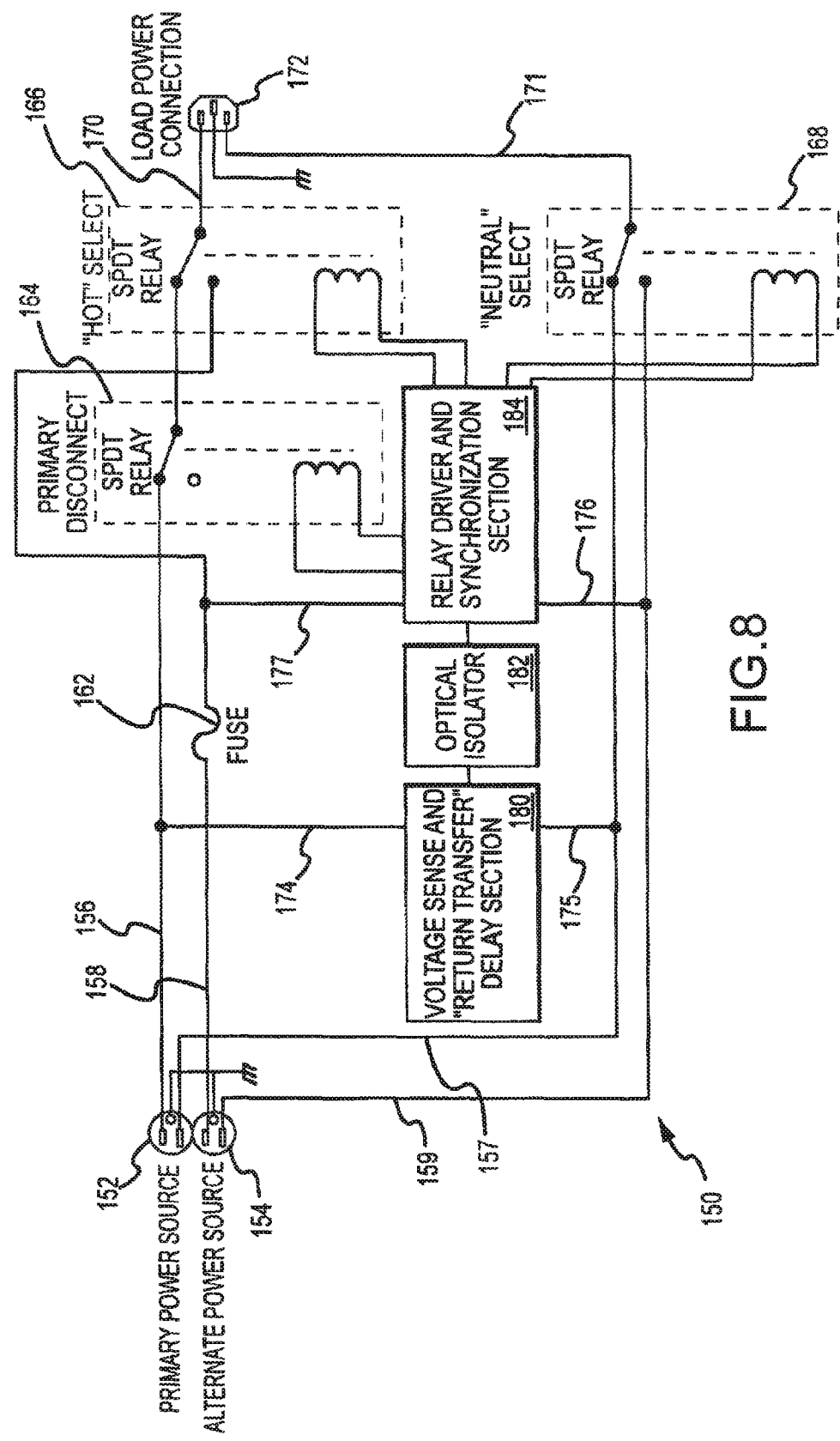
FIG. 8 illustrates a schematic diagram for an exemplary auto-switching module.

FIG. 8 illustrates a schematic diagram of another embodiment of an auto-switching module 150. The basic functionality of the module 150 is to facilitate the fast transfer of power delivered to a load power connection 172 between a primary power source connection 152 and an alternate power source connection 154. For example, the module 150 may transfer the power during a period that is less than about 15 milliseconds, and preferably less than 10 milliseconds.

Generally, the module 150 operates to couple the primary power source connection 152 to the load power connection 172 when the power at a primary power source is stable. Further, in response to a loss of power quality at the power source coupled to the primary power source connection 152, the module 150 is operable to couple the load power connection 172 to the alternate power source connection 154 that is connected to an alternate power source until power at the primary power source connection 152 is restored. The module 150 may be operable to sense various power quality features on the primary power source connection 152, and to switch the power connection in response to these features. The power quality features sensed by the module 150 may include interruptions, undervoltage, overvoltage, voltage fluctuations, frequency variations, or the like. The specific features and operation of the module 150 are described in detail below.

The module 150 may include two single pole double throw (SPDT) relays 166 and 168 to facilitate the transfer of power between the primary power source connection 152 and the alternate power source connection 154. As shown, the relay 166 couples the hot conductor 156 of the primary power source connection 152 to the hot conductor 170 of the load power connection 172. The relay 166 also couples the hot node 158 of the alternate power source 154 with the hot conductor 170 of the load power connection 172. Similarly, the neutral conductors 157, 159 of the primary power source connection 152 and the alternate power source connection 154, respectively, are also coupled to the neutral conductor 171 of the load power connection 172 through relay 168.

The module 150 also includes a third SPDT relay 164 that is positioned in the path of the primary power source connection 152. The relay 164 serves to protect against an undesirable effect referred to herein as "arc carryover." Arc carryover occurs when the current through the contacts of a relay is great enough to allow an arc generated by the breaking of a contact to which a load was previously connected to continue until the contact reaches the alternate source. This may result in an effective short-circuit between two power sources, which under certain conditions, may cause the current to increase rapidly, which could damage equipment or trip a circuit protection device, causing system downtime. One way to reduce the probability of arc carryover is to ensure a sufficient separation gap between the primary input relay contact and the secondary relay contact. However, in space-limited applications, the size restrictions for the module 150 may preclude the use of relays having a sufficient separation gap.

To reduce the probability of arc carryover, the relay 164 is introduced in the path of the primary power source connection 152 as a disconnect relay. That is, the alternate pole of the relay 164 is unconnected. The relay 164 functions in a timed relationship with the relays 166, 168 in a manner such that during a transfer sequence from one power source to the other, the disconnect relay 164 disengages the primary power path from the secondary power path during the short period when the transfer relays 166 and 168 change from one position to the other. By slightly offsetting the timing of the actions of the disconnect relay 164 from the switching action of the transfer relays 166 and 168, it can be assured that the AC power will pass through a zero current level during the transfer cycle. This, in conjunction with the addition of the third separation gap provided by the relay 164, increases the arc suppression capacity of the module 150 significantly. To control the timing and driving of the relays 164, 166, and 168, a Relay Driver and Synchronization section 184 is provided. The section 184 may include various analog and digital electronics to drive the relays 164, 166, and 168. Driving the relays using electronics, as opposed to direct actuation from the power sources, has advantages that are discussed below.

To further protect against arc carryover, a fuse or circuit breaker 162 is positioned in the path of the alternate power source connection 154. It should be appreciated that a fuse or circuit breaker may be applied in the path of the primary power source connection 152 in addition to, or instead of, the path of the alternate power source connection 154. The fuse or circuit breaker 162 may be a fast acting device that is operable to open prior to the opening of a branch circuit breaker, which may prevent localized overload conditions from affecting other attached equipment on the same branch circuit. In one embodiment, a 20 A power-limiting fast-acting fuse is used, but other values or other circuit protection devices may be substituted to provide the desired protection in various applications of the module 150. Further, the circuit breaker 162 may be resettable.

The inventors have further recognized that it may be desirable to introduce a delay when returning power from the alternate power source connection 154 to the primary power source connection 152 following loss of power quality on the primary power source. In this regard, a delay may help reduce the number of transitions in the event that the primary power source is intermittent, or in a low or high voltage condition that may cause the relays to transfer back and forth unnecessarily. As an example, a delay of three to five seconds may be introduced from the time the primary power source is of acceptable quality to the time the module 150 returns power from the alternate power source to the primary power source. To provide this delay, a Voltage Sense and Return Transfer Delay section 180 is provided. The section 180 is operable to sense the voltage at the primary power source connection 152 via nodes 174 and 175. Once the section 180 has determined that acceptable voltage at the primary power source 152 has been available for a predetermined period of time (e.g., 3 to 5 seconds), the section 180 provides a signal to the Relay Driver and Synchronization section 184. As shown, the sections 180, 184 are coupled together by an optical isolator 182 that functions to electrically isolate the primary power source connection 152 from the alternate power source connection 154. After receiving a signal from the section 180, the Relay Driver and Synchronization section 184 may then use electronic control circuitry to activate the relays 164, 166, and 168, which in turn returns power from the alternate power source connection 154 to the primary power source connection 152. It should be appreciated that the sections 180 and 184 may include various digital and/or analog components to achieve the voltage sensing and delay functions. For example, in one embodiment the section 180 includes a digital timer.

The use of electronic control circuitry by section 184 to drive the relays 164, 166, 168, instead of direct actuation by the primary power source, may provide significant advantages. In previous embodiments, the relays are energized by the primary power source, such that the primary power source remains connected to the load power connection when the primary power source is stable. In the event of a loss of power quality at the primary power source, the relays are not held, and therefore release, which in turn connects the load to the alternate power source. Upon return of power to the primary source, the relays immediately energize, therefore reconnecting the load to the primary power source. As discussed above, this configuration does not allow for a delay to be introduced when transferring from the alternative power source back to the primary power source. Further, this configuration requires the relays to be energized the majority of the time (i.e., whenever the primary power source is stable), causing unnecessary power consumption and reduced relay life expectancy, which reduces the overall reliability of the module 150.

To solve the aforementioned problems, the relays 164, 166, 168 are driven from the alternate power source connection 154. This is accomplished by coupling the relay driver section 184 to the alternate power source connection 154 through nodes 176 and 177. Therefore, the previously described electronic delay circuitry may now use the available alternate power source to operate from during the delay period. Further the relays 164, 166, and 168 may be energized only during an outage period of the primary power source 152, which may be a relatively rare event. Therefore, this configuration may significantly extend the probable life expectancy of the relays, reduce power consumption, and improve the overall reliability of the module 150. For example, in one embodiment, the average power dissipation of the module 150 is less than about 200 milliwatts, and preferably less than about 125 milliwatts.

Although not shown, it should be appreciated that various types of circuit protection devices (e.g., varistors, Zener diodes, etc.) may be coupled across the input or output conductors to limit voltage spikes due to external or switching transients. Also, various types of line filters may be included if necessary or desired.

While the invention has been illustrated and described in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the invention are desired to be protected.

What is claimed:

1. A method for use in delivering power to a device having a power cord terminating in a standard plug, said method comprising the steps of:
    providing a module including a module receptacle for receiving said standard plug and a switch for switching a connection of said module receptacle, said switch comprising a first relay for selectively connecting a load power connection to either a first power source or a second power source, said first relay being connected between said first power source and said module receptacle and further being connected between said second power source and said module receptacle, and a second relay for selectively connecting or disconnecting said first power source from said first relay;
    first connecting said module to said first and second power sources;
    second connecting said standard plug to said module receptacle;
    sensing a power quality from said first power source; and
    switching said connection of said module receptacle using said switch in response to sensing a reduction of said power quality such that said module receptacle is connected to only one of said first and second power sources; and
    controlling a timing of said switching so as to suppress arc carryover during said switching by operating said first and second relays in a predetermined timed sequence.

2. The method as set forth in claim 1, wherein said step of first connecting comprises providing a standard electrical outlet having first and second standard receptacles configured to provide power from said first and second power sources, respectively, and connecting said module to said first and second standard receptacles.

3. The method as set forth in claim 1, wherein said step of first connecting comprises providing a power strip having first and second strip receptacles configured to provide power from first and second power sources, respectively, and connecting said module to said first and second strip receptacles.

4. The method as set forth in claim 1, wherein said step of second connecting comprises plugging said standard plug directly into said module receptacle.

5. The method as set forth in claim 1, wherein said step of second connecting comprises plugging said standard plug into a strip receptacle of a power strip and interconnecting said power strip to said first and second power sources via said module.

6. The method as set forth in claim 1, further comprising the step of connecting a network device of a data center to said first and second power sources via said module.

7. The method as set forth in claim 1, further comprising the step of connecting a medical device to said first and second power sources via said module.

8. A method for use in delivering power to a device having a power cord terminating in a standard plug, said method comprising the steps of:
    providing a first standard receptacle for receiving said standard plug, said first standard receptacle being selectively associated with only one of first and second power sources via a switch, said switch comprising a first relay for selectively connecting a load power connection to either said first power source or said second power source, said first relay being connected between said first power source and said first standard receptacle and further being connected between said second power source and said first standard receptacle, and a second relay for selectively connecting or disconnecting said first power source from said first relay;
    sensing a predetermined undesirable change in power quality from one of said first and second power sources;
    responsive to said change, cycling said switch to provide power to said first standard receptacle from the other of said first and second power sources; and
    timing said cycling so as to suppress arc carryover during said cycling by operating said first and second relays in a predetermined timed sequence.

9. The method as set forth in claim 8, further comprising the steps of:
    sensing a restoration of power quality from said one of said first and second power sources; and
    responsive to said restoration, cycling said switch to provide power to said first standard receptacle from said one of first and second power sources.

10. The method as set forth in claim 8, further comprising the step of providing a second standard receptacle for receiving a standard plug, said second standard receptacle being selectively associated with said first and second power sources via said switch.

11. The method as set forth in claim 8, wherein said device comprises a power strip, said power strip including multiple receptacles for receiving standard plugs.

12. The method as set forth in claim 8, wherein said device is a network device of a data center or a medical device.

13. An apparatus for use in delivering power to a device having a power cord terminating in a standard plug, comprising:
- a first standard receptacle for receiving a standard plug;
- a first terminal assembly for interconnecting to a first power source;
- a second terminal assembly for interconnecting to a second power source; and
- a switch for selectively interconnecting said first standard receptacle to either said first terminal assembly or said second terminal assembly, wherein said switch is operative for sensing a power quality of said first power source and for switching a connection of said first standard receptacle responsive to said power quality such that said first standard receptacle is connected to only one of said first and second power sources, said switch comprising a first relay for selectively connecting a load power connection to either said first power source or said second power source, said first relay being connected between said first power source and said first standard receptacle and further being connected between said second power source and said first standard receptacle; and
- an arc carryover suppresser control said switch so as to cycle said first relay at a time when substantially no current is flowing into said first standard receptacle.

14. The apparatus of claim 13, wherein said switch comprises circuitry disposed within said apparatus and coupled to said first and second terminal assemblies and said standard receptacle, and wherein said circuitry is operable to sense said power quality on one of said terminal assemblies and automatically couple said standard receptacle to one of said terminal assemblies in accordance with a value of said power quality.

15. The apparatus of claim 14, wherein said circuitry is operable to automatically couple said standard receptacle to one of said terminal assemblies in accordance with a value of said power quality after a predetermined period of time.

16. The apparatus of claim 14, wherein said circuitry comprises a timer.

17. The apparatus of claim 14, wherein said circuitry comprises an optical isolation circuit for isolating said first and second power sources.

18. The apparatus of claim 14, wherein said circuitry is operable to automatically couple said standard receptacle to one of said terminal assemblies in accordance with a value of said power quality in a period of time that is less than about 15 milliseconds.

19. The apparatus of claim 13, wherein said power quality includes at least one of interruptions, undervoltage, overvoltage, voltage fluctuations, and frequency variations.

20. The apparatus of claim 13, wherein said apparatus has an average power dissipation at full load of less than about 5 watts.

21. The apparatus of claim 13, wherein said apparatus has an average power dissipation at no load of less than about 200 milliwatts.

22. The apparatus as set forth in claim 13, further comprising a second standard receptacle for receiving a standard plug, said second standard receptacle being interconnected to said switch so as to selectively receive power from either said first power source or said second power source.

23. The apparatus as set forth in claim 13, wherein said apparatus is adapted to plug into a standard receptacle configured to receive power from said first and second power sources.

24. The apparatus as set forth in claim 13, wherein said apparatus is adapted to plug into a power strip having receptacles associated with first and second power sources.

25. The apparatus as set forth in claim 13, further comprising a power strip interconnected to said first standard receptacle, said power strip including multiple receptacles for receiving standard plugs.

26. The apparatus as set forth in claim 13, wherein said device is an electrical or electronic device of a data center.

27. The apparatus as set forth in claim 13, wherein said device is a medical device.

28. The apparatus as set forth in claim 13, wherein said apparatus is incorporated into a standard receptacle.

29. The apparatus as set forth in claim 13, wherein said device includes a single power cord.

* * * * *